United States Patent [19]

Rausch

[11] Patent Number: 4,497,403

[45] Date of Patent: Feb. 5, 1985

[54] CARTRIDGE CONTAINING MULTIPLE AREAS OF A MULTI-COMPONENT MIX AND METHOD OF MAKING THE SAME

[75] Inventor: Paul G. Rausch, Lexington, Ky.

[73] Assignee: Celtite, Inc., Georgetown, Ky.

[21] Appl. No.: 507,445

[22] Filed: Jun. 24, 1983

[51] Int. Cl.³ .............................................. B65D 25/08
[52] U.S. Cl. .................................. 206/219; 206/568; 405/261
[58] Field of Search .............................. 206/219–222, 206/568, 526, 484; 383/37, 38, 39; 405/260, 261; 411/15, 82

[56] References Cited

U.S. PATENT DOCUMENTS

| | | | |
|---|---|---|---|
| 2,015,972 | 10/1935 | Sodergren | 206/568 |
| 2,874,830 | 2/1959 | Birmingham, Jr. | 206/221 |
| 3,015,386 | 1/1962 | Vogt | 206/526 |
| 3,550,764 | 12/1970 | Tigner | 206/497 |
| 3,749,620 | 7/1973 | Montgomery | 206/219 |
| 4,007,831 | 2/1977 | Bernhardt | 405/261 |
| 4,263,832 | 4/1981 | Lang et al. | 405/261 |
| 4,279,340 | 7/1981 | Lang | 405/261 |
| 4,291,799 | 9/1981 | Bower, Jr. | 206/219 |
| 4,372,708 | 2/1983 | Bower, Jr. et al. | 206/219 |

FOREIGN PATENT DOCUMENTS

| | | | |
|---|---|---|---|
| 1935149 | 1/1971 | Fed. Rep. of Germany | 405/261 |
| 1239014 | 7/1960 | France | 206/526 |
| 7610573 | 3/1978 | Netherlands | 206/219 |
| 0064945 | 6/1942 | Norway | 206/219 |

*Primary Examiner*—William T. Dixson, Jr.
*Assistant Examiner*—Jimmy G. Foster
*Attorney, Agent, or Firm*—Caesar, Rivise, Bernstein & Cohen, Ltd.

[57] ABSTRACT

A cartridge comprised of a multiplicity of at least four smaller longitudinal pockets, each pocket containing a component of a multi-component of a self-setting mix to provide blending together of intermixing of the components when the bundle of pockets in the cartridge are ruptured in a bore hole by inward pressure from an anchor element. In one embodiment of the invention the pockets are formed in partially filled envelopes so that when the envelopes are packed together in longitudinal relationship, the resulting cartridge has a generally circular cross-section. The cartridge is held within an outer porous casing, such as netting. In another embodiment of the invention the pockets extend from a common base.

9 Claims, 21 Drawing Figures

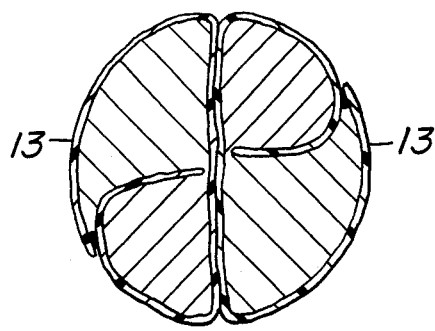
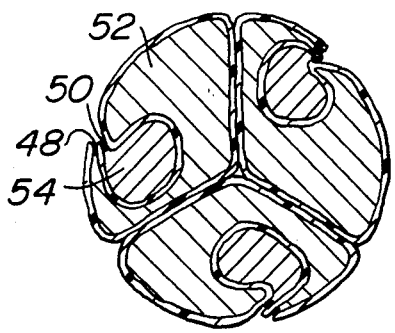
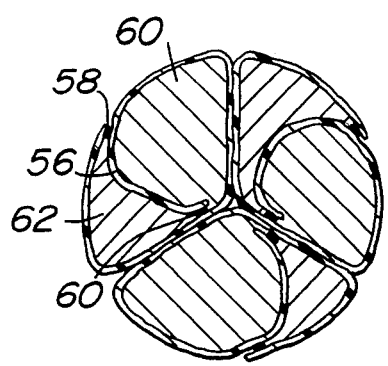
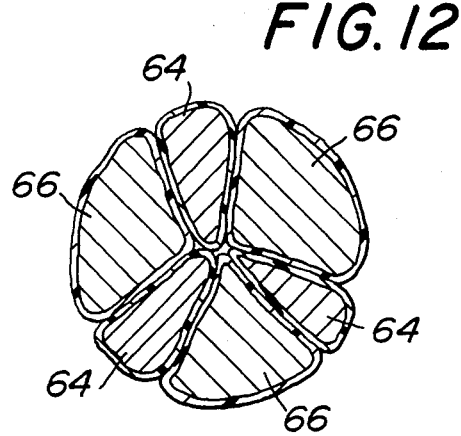
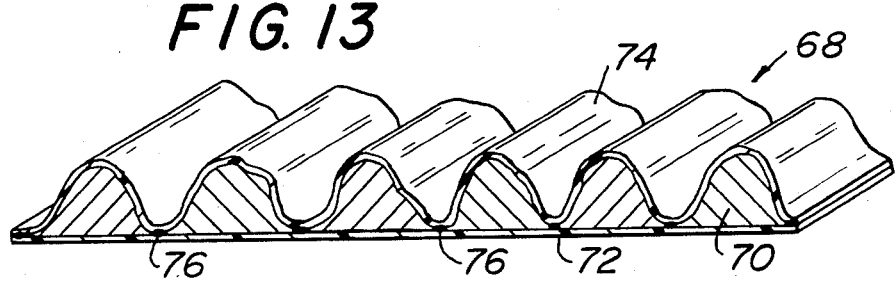

CARTRIDGE CONTAINING MULTIPLE AREAS OF A MULTI-COMPONENT MIX AND METHOD OF MAKING THE SAME

This invention relates to a cartridge which is used to secure an anchor element in a substrate, for example, an anchor bolt in a borehole in a rock substrate, such as a tunnel or a mine, using a self-setting composition.

The invention particularly relates to techniques for securing and anchoring elements using cartridges containing pre-proportioned quantities of interactive components of the self-setting composition and above all to such cartridges where the interactive components are arranged to make a self-setting compositions. The present invention constitutes an improvement over the aforesaid cartridges.

The resin composition used with the present invention, as with the prior cartridges, may be based on an epoxy resin or a polyester resin. To a certain extent more emphasis will be given to the resin composition being a polyester resin although it should be understood that other organic and inorganic systems or systems involving other two, three or higher multiple component resins may be used in a like fashion or other adhesives constituting but a single component may also be used.

In the usual polyester resin composition, there are usually two interactive components, one comprising an unsaturated resin, and the other comprising a hardener therefor. Specifically, the unsaturated polyester resin may be formulated with a filler and an accelerator, such as dimethyl aniline or cobalt naphthenate. The other component is a catalyst for the resin and typically comprises a filler together with a hardener, such as benzoyl peroxide, methyl-ethyl-ketone or cyclohexanone.

It is known in British Patent Specification Nol. 953,056 to provide a cartridge which comprises a glass tubular container within which is another glass tube. The major container holds the unsaturated polyester resin, whereas the catalyst is contained within the inner glass tube. There are two disadvantages to the use of this cartridge. First, the glass tube can easily be broken accidentally either during transport or while attempting to insert the cartridge in a borehole. Secondly, the components must be mixed for a critical period of time by rotating an anchor element through the cartridge. While the glass cartridge has achieved acceptance in certain markets, it is relatively expensive and has not been adopted on a universal basis.

Attention is also called to British Pat. Nos. 1,323,112 and 1,323,113. These two patents show a breakable cartridge having as many as three separate tubular containers disposed inside the cartridge. Here again, the breakable nature of the cartridge presents the problems as set forth hereinabove. Also, it is difficult or costly to maintain the particular placement of the internal separate tubular containers.

Another approach is set forth in U.S. Pat. No. 3,731,791 where the unsaturated resin and catalyst layers in a single cartridge are in actual contact with each other and interact to a slight extent to form a polymerized interface. Such a cartridge is used by being exposed to a rotary force wherein a rotating anchor element acts upon the cartridge. While such cartridge has been widely used, it suffers from various problems including short shelf life in warm climates as well as possible inadequate or excessive mixing of the interactive components.

In U.S. Pat. No. 4,007,831 the cartridge is comprised of two containers that are joined together by means of a double side adhesive tape. Each container comprises a tubular plastic bag with both containers being sealed at each end by means of a single metal clip. The upper container is partially filled with a catalyst or hardener whereas the lower container is essentially fully filled with the resin so as to assume a generally circular cross-section. The partially filled upper container is draped over the filled lower container with the double side adhesive serving to hold two containers together. The components are mixed by rotating an anchor element through the two containers. The problem here is that the hardener is located quite remote from the center of the filled resin cartridge, and thus there is a possibility of inadequate mixing unless special care is taken to provide vigorous mixing for a sufficient length of time.

A single seal cartridge has been proposed in U.S. Pat. No. 3,918,235, but involves the concept of a friction seal which exists mainly in theory and not in fact.

A single seal cartridge is shown in U.S. Pat. No. 3,915,287, but such cartridge still requires a polymerized interface for a portion of the common area between the resin and the catalyst to which the internal flap does not extend.

Another cartridge is set forth in U.S. Pat. No. 3,992,854 which brings together three thicknesses of film that are simultaneously heat sealed together as shown in FIG. 8 of the patent. However, the sealing of three thicknesses creates manufacturing problems to maintain seal and cartridge integrity. If a successful seal is achieved, there are presented mixing problems inherent to all separate compartment cartridges.

From the foregoing it can be seen that the problem of mixing through the rotation of an anchoring element remains that one that has not been truly solved.

All of the above cartridges require that the components be mixed by a rotational force, usually the acting of the rotating anchor element upon the cartridge. Thus, inadequate or excessive rotation can adversely affect the strength of the anchorage. In certain situations it is undesirable or even impossible to rotate the anchor element.

In another fixing technique rotation of the fixing element is replaced by an axial thrust of the fixing element in a so-called no-spin operation. U.S. Pat. No. 4,343,399 represents one of the latest no-spin cartridges. Here, a cartridge is provided having a single component of a self-setting mix in a thin plastic casing. A chamber is secured to the cartridge and has a sidewall with plural openings. Mechanical perforating means are interposed between the cartridge and the chamber. The second component of the mix is located within the chamber. The perforating means is arranged to mechanically rupture the cartridge upon the axial inward thrust of the fixing element. Upon rupture of the cartridge, the contents of the cartridge are caused to be carried to the chamber so that the two components of the self-setting mix are throughly intermixed and extruded through the chamber sidewall openings in a radial direction and into the borehole.

The cartridge of U.S. Pat. No. 4,343,399 has worked well. However, in using such cartridge it is necessary that it be inserted in the borehole in the proper orientation so that the thin plastic casing is innermost. Also, shelf life problems have been noted with reference to the catalyst that is contained within the chamber, notwithstanding modification where the entire cartridge assembly is wrapped in a shrink-wrap material. Furthermore, this cartridge has limited length.

Accordingly, it is an object of the present invention to provide a no-spin cartridge wherein orientation in the borehole is immaterial.

Still another object of the invention is to provide a cartridge and method of making the same, which upon activation by an axial thrust of the fixing element achieves good mixing of the components.

Still another object of the present invention is to provide a cartridge having a considerably longer shelf life wherein the interactive components are preserved essentially in isolated state, but wherein mixing of the interactive components is not significantly impeded.

Yet another object of the invention is to provide a cartridge which can be of long length.

The foregoing as well as other objectives of the invention are achieved by providing a cartridge containing multiple areas of a multiple component mix. In the first embodiment of the invention, there is provided multiple small envelopes which are bound together into a single cartridge. In one embodiment of the invention there are three envelopes or smaller cartridges, each containing the resin or the catalyst. Each of the three smaller envelopes are initially independent envelopes which are sealed at each end during the filling process. The three small envelopes are then brought into contact with each other in a longitudinal orientation so that three common ends of the envelopes are positioned closely together at each end. The three bound small envelopes are then held within a suitable netting or mesh-like casing.

In another embodiment of the invention a plastic film assembly is formed with separately formed longitudinally disposed envelopes or pockets extending from a base. Either resin or catalyst is introduced into the desired number of pockets. This plastic film assembly can be formed so as to lie generally flat or can be folded in various forms or otherwise joined together with clips.

Other objectives and many of the attendant advantages of the invention will become more readily apparent by reference to the figures of the drawing wherein:

FIGS. 8 to 12 are views similar to FIG. 5, but wherein the multiple smaller cartridges are constructed in various ways;

FIG. 13 is a three dimensional view, partly in section showing another aspect of the present invention in the form of a plastic film assembly with separate longitudinally extending pockets;

Figure 1:
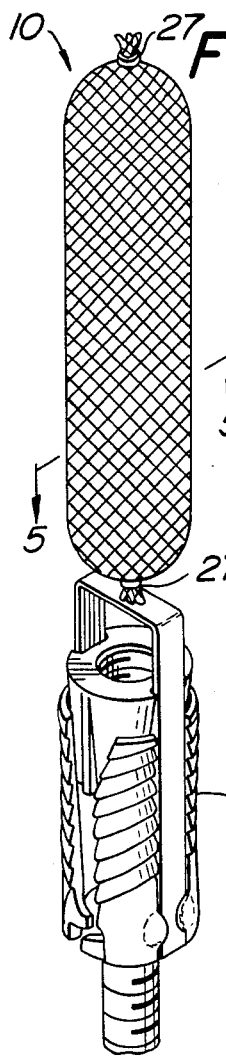
FIG. 1 is a three dimensional view showing a cartridge of the present invention as well as a fixing element in relation to the cartridge.
Figure 19:
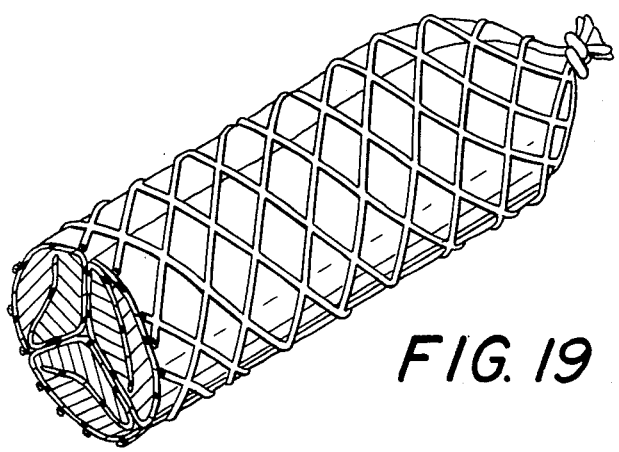
Figure 20:
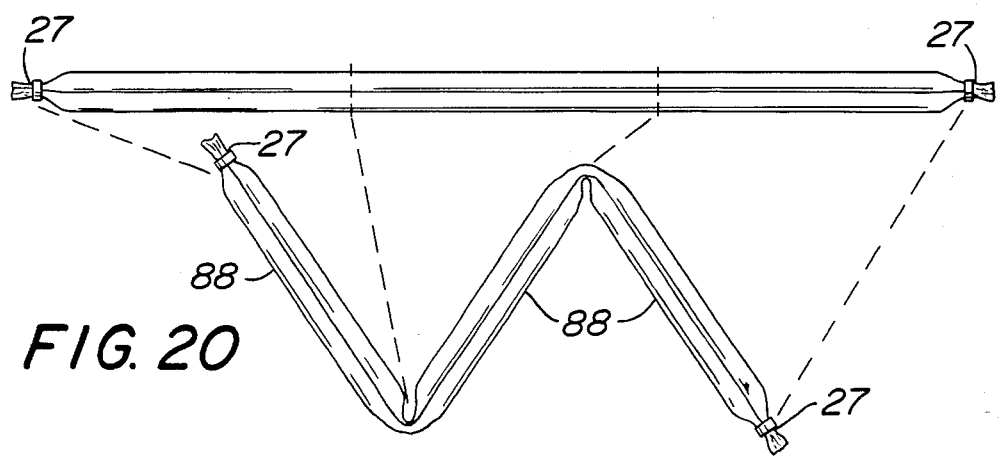
Figure 21:
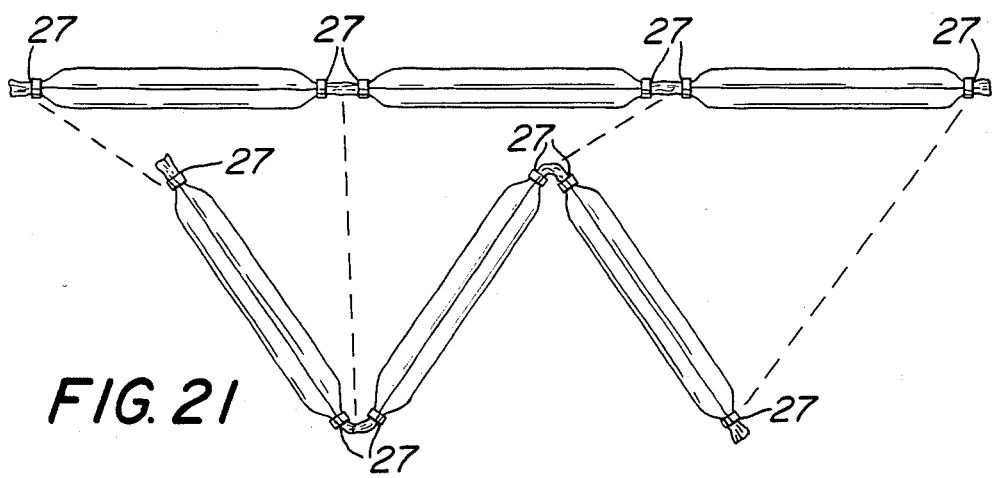

FIG. 19 is a three dimensional view showing a cartridge of a type generally similar to the one shown in FIG. 1, but wherein netting is used rather than mesh; and FIGS. 20 and 21 are views of an extended envelope, such as one of the envelopes of FIG. 12, wherein such extended envelope has been folded in a fan-fold manner in a lateral sense. In FIG. 21 clips are used to separate the various fold portions.

Referring now in greater detail to the various figures of the drawing wherein like reference characters refer to like parts, there is shown generally at 10 in FIG. 1 a cartridge containing multiple areas of a multi-component mix, constituting a first embodiment of the invention.

Figure 2:
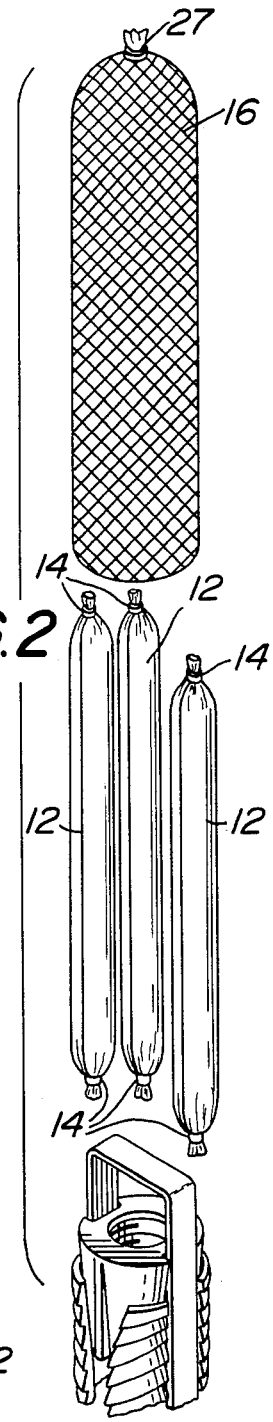
FIG. 2 is an exploded view, somewhat similar to FIG. 1, but wherein the multiple smaller cartridges contained within the mesh or casing are exposed.
Figure 5:
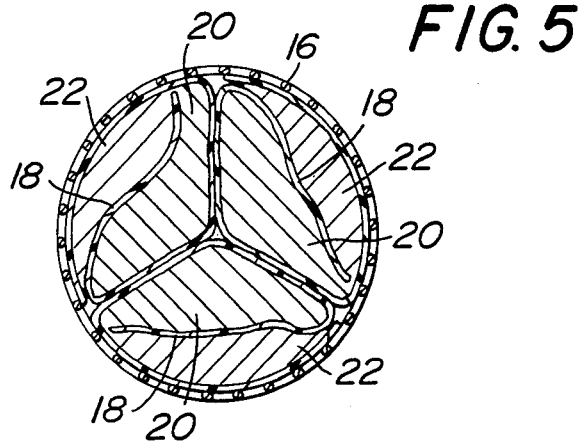
FIG. 5 is an enlarged sectional view taken along the lines 5—5 of FIG. 1.

As best shown in FIG. 2 the cartridge 10 is comprised of three smaller envelopes or pockets 12 secured at each end 14 by clips (FIG. 2) in a manner well known in the art. Each of the envelopes 12 are formed from a plastic film, such as polyester laminate. As will be discussed, the smaller envelopes 12 are only partially filled, such that when they are packed together and inserted into net casing 16 the three smaller envelopes together can be disposed in a generally circular cross-section as shown in FIG. 5.

In one embodiment of the invention each envelope 12 is constructed and filled in accordance with U.S. Pat. No. 3,915,287 so as to have an internal flap 18 which for the most part separates interactive components 20 and 22.

Figure 3:
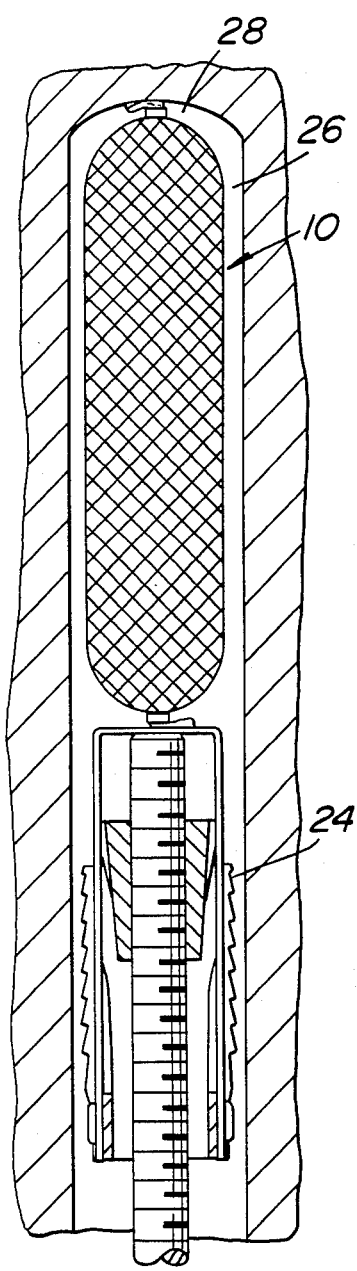
FIG. 3 is a sectional view of the assembly of FIG. 1, but showing the cartridge inserted against the blind end of a borehole and a fixing element about to be axially thrust against the cartridge.

As shown in FIGS. 1 and 3 the anchor element 24 is constructed in a manner well known in the art, although other designs of anchor elements can be used.

As is further shown in FIG. 2 when the three smaller envelopes 12 are longitudinally disposed in nesting condition in relation to one another, they are all secured or packed together in the net casing 16, with the ends of the casing 16 being secured together with clips 27.

Figure 4:
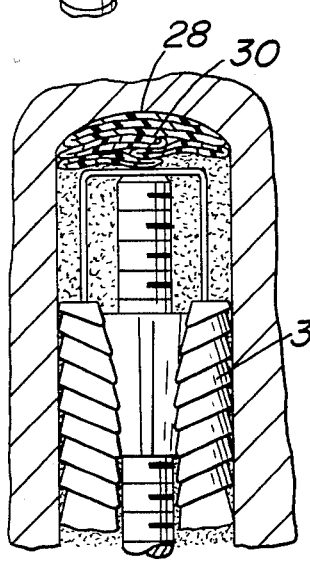
FIG. 4 is a view similar to FIG. 3, but wherein the fixing element has advanced inwardly to compress the cartridge and cause its contents to be emptied into the borehole adjacent the innermost portion of the fixing element.

In use the cartridge 10 is inserted in borehole 26, such that the inner end of the cartridge 10 is closely adjacent to the blind end 28 of the borehole 26. The anchor element 24 is urged inwardly against the cartridge 19 in the manner as shown in FIGS. 3 and 4. This causes complete collapsing and intermixing of the contents of cartridge 10 which is compressed to a porous mass 30 adjacent end 28 of hole 26. The contents of the cartridge 10 are intermixed and flow about the inner end of the fixing element 24 so as to contact expansion arms 32.

Figure 6:
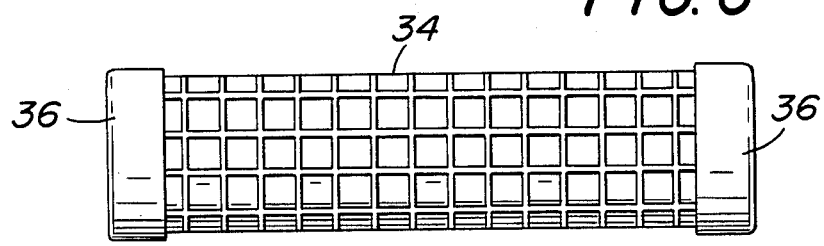
FIG. 6 is an elevational view of a second embodiment of the cartridge of the present invention involving the use of a frangible plastic or wire cage with plastic or metal end caps.
Figure 7:
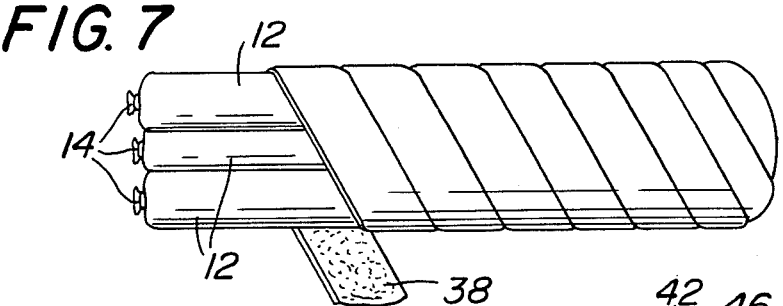
FIG. 7 is an elevational view of a third embodiment of the cartridge of the present invention wherein the multiple smaller cartridges are taped together by a helically wound tape.

Two additional variants of cartridge 10 are shown in FIGS. 6 and 7. In FIG. 6 the three partially filled smaller envelopes 12 are secured within a frangible plastic or wire cage 34 having plastic or metal end caps 36. In FIG. 7 the envelopes 12 are secured together by means of wrapping tape 38 that is wound in a helix about the longitudinally nested, partially filled envelopes 12.

Figure 8:
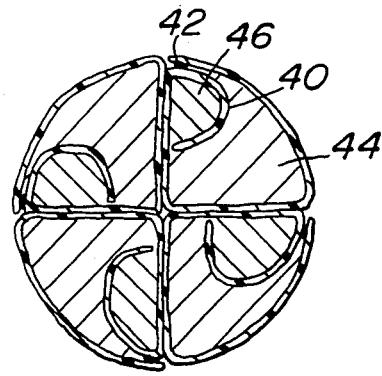

FIGS. 8 through 12 are similar to FIG. 5 but involve the use of smaller envelopes 12 having a somewhat different internal configuration. In FIG. 8 each of the smaller envelopes are formed with an internal flap 40 that extends away from single seal 42. Since the resin normally occupies the larger volume it is present as 44 in FIG. 9 with the catalyst being present as 46 in the pocket formed by flap 40.

FIG. 9 is similar to FIG. 5 except that only two smaller envelopes 13 are used. In FIG. 10 the smaller catalyst area is formed in accordance with U.S. Pat. No. 4,009,778 which requires the presence of double seals 48 and 50. The resin is present in the larger volume 52 of a particular smaller cartridge with the catalyst being introduced into pocket 54.

In FIG. 11 three smaller envelopes are formed in accordance with U.S. Pat. No. 3,795,081 wherein the barrier wall 56 in a particular cartridge is sealed at two particular points 58 and 60 to form a complete barrier between resin section 60 and catalyst section 62.

FIG. 12 illustrates the use of three smaller envelopes 64 and three larger envelopes 66. As with all other embodiments heretofore discussed, each of the smaller envelopes are only partially filled so as to allow for the longitudinal nesting previously discussed. In this way the six envelopes can be disposed together in the circular cross-section of FIG. 12.

By now it should be clear that other cartridge confirgurations, such as shown in U.S. Pat. Nos. 3,889,446 and 3,918,235 can be used.

Figure 14:
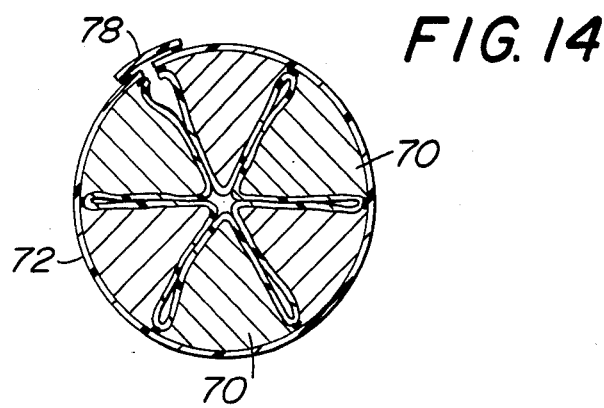
FIG. 14 is a view similar to FIG. 12, but wherein the plastic film assembly has been wound upon itself to produce a cartridge having a generally circular cross-section.

FIG. 13 shows another aspect of the present invention involving plastic film assembly 68 with separate longitudinally extending envelopes or pockets 70. The plastic film assembly 68 comprises a base film 72 and a cover film 74 in convoluted form. The cover film 74 is secured at various points 76 and heat sealed in a manner well known to those skilled in the art since films 72 and 74 may be of a thermoplastic material. Either catalyst or resin can be introduced into a given longitudinally extending pocket 70. As shown in FIG. 14 the plastic film assembly can be longitudinally wrapped upon itself to achieve a cartridge having a generally circular cross-section through the use of a longitudinally disposed tape 78 which may be heat sealed or secured with an adhesive, such a tacky adhesive to the outer surface of the base film 72. In making the plastic film assembly 68, it is sometimes preferable that the pockets 70 be incompletely filled so as to facilitate flexing or bending of the assembly.

Figure 15:
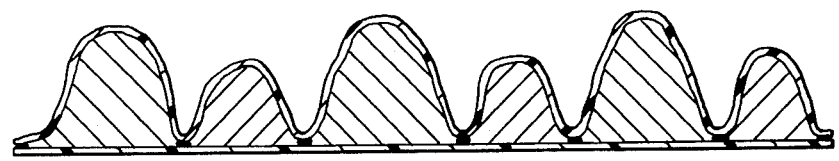
FIG. 15 is a view similar to FIG. 13, but wherein certain of the longitudinally extending pockets are smaller than the other pockets.
Figure 16:
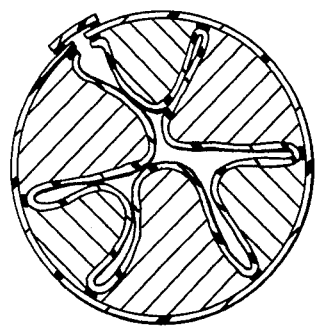
FIG. 16 is a sectional view, similar to FIG. 14, but showing the plastic film assembly of FIG. 16 wound upon itself.

FIGS. 15 and 16 are similar to FIGS. 13 and 14, but wherein the pockets 70 will vary in cross-sectional area. Thus, the resin may be introduced into the large pockets 70 and the catalyst into the smaller pockets 70.

Figure 17:
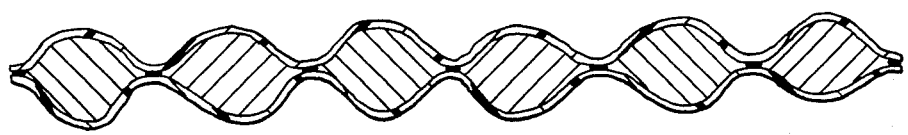
FIG. 17 is a view similar to FIG. 13, but showing a modified form of the plastic film assembly wherein the longitudinally extended pockets are of a generally circular cross-section.
Figure 18:
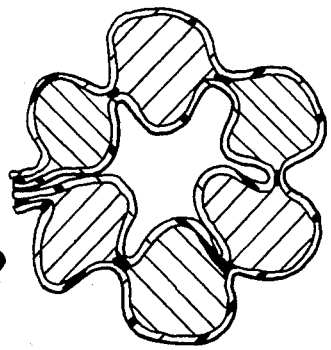
FIG. 18 is a sectional view generally similar to FIG. 14 wherein the plastic film assembly has been wound upon itself.

FIGS. 17 and 18 are similar to FIGS. 14 and 15, but wherein the pockets 70 have a generally circular cross-section. This is achieved by having both the base film 72 and the cover film 74 formed into a convoluted complimentary shape.

Returning to FIG. 1 it will be seen that the multiple smaller cartridges are introduced into a net casing 16. As shown in FIG. 19, a relatively wide or porous mesh may be used to maintain the smaller cartridges 12 in longitudinally nesting relationship until use.

Finally, FIGS. 20 and 21 relate to an extended envelope. It will be noted that the ends of the extended envelope are secured together in clips 27. The envelope may then be folded in a lateral direction (two or more) folds 88. Also, the extended envelope can have clips 27 subdividing each envelope into two or more sections which can then be fan-folded in the manner of FIG. 21.

It will occur to those skilled in the art in connection with FIG. 1 that where three smaller cartridges 12 are being used, each should be filled no more than approximately 30% of the volume of the total package so as to allow the three smaller catridges to be longitudinally nested in a configuration having a generally circular cross-section of FIG. 5. The degree of filling of the cartridges or areas, such as in FIGS. 8 to 13, or pockets, such as FIGS. 14 to 19, will occur readily to those skilled in the art to allow adjustment of shaping of the plastic film assembly to have a cross-section of desired shape or proportions.

It is obvious that increasing the number of individual pockets in the cartridge will improve the distribution and therefore the blending or intermixing characteristics of the cartridge when ruptured. However, for practical and economic reasons it is also desirable to keep the number of pockets to a minimum. It has been found that six pockets provide a satisfactory compromise and effectively blends the components when ruptured in the bore hole.

Without further elaboration, the foregoing will so fully illustrate my invention that others may, by applying current or future knowledge, readily adapt the same for use under various conditions of service.

I claim:

1. A cartridge containing multiple areas of a multi-component mix, said cartridge comprising multiple small, non-rigid envelopes each having a pair of ends and formed of a film and containing at least one component of said multi-component mix, said envelopes being in contact with each other and being longitudinally disposed with the corresponding ends disposed laterally of each other, such that said envelopes are packed closely together, and an outer porous casing enclosing said envelopes.

2. The cartridge of claim 1, wherein said envelopes are partially filled.

3. The cartridge of claim 1, wherein each envelope contains at least two components of said multi-component mix.

4. The cartridge of claim 1, wherein each envelope is divided into pockets by an internal barrier wall, with one component of said mix being located in a first section and another component of said mix being located in a second section.

5. The cartridge of claim 1, wherein said cartridge has a generally sausage shape and a generally circular cross-section, with said porous casing binding said envelopes into a single cartridge.

6. The cartridge of claim 5, wherein said casing is netting.

7. The cartridge of claim 4, wherein there are three envelopes containing a total of six pockets.

8. The cartridge of claim 4, wherein an extended envelope is folded three times to form six longitudinally disposed pockets.

9. The cartridge of claim 8, wherein said base is generally circularly disposed.

* * * * *